(12) United States Patent
Kao

(10) Patent No.: US 6,805,275 B1
(45) Date of Patent: Oct. 19, 2004

(54) DEVICE FOR FASTENING BARREL OF GAS OPERATED SOLDERING GUN

(75) Inventor: Jin-Shong Kao, Tucheng (TW)

(73) Assignee: Rekrow Industrial Inc., Tucheng (TW)

( * ) Notice: Subject to any disclaimer, the term of this patent is extended or adjusted under 35 U.S.C. 154(b) by 0 days.

(21) Appl. No.: 10/611,873

(22) Filed: Jul. 3, 2003

(51) Int. Cl.⁷ .................................................. B23K 3/02
(52) U.S. Cl. .......................................... 228/55; 126/413
(58) Field of Search ........................ 228/51, 53, 55; 219/86.8; 431/344, 345; 126/413, 414

(56) References Cited

U.S. PATENT DOCUMENTS

| | | | | |
|---|---|---|---|---|
| 1,596,061 A | * | 8/1926 | Meyer | 228/54 |
| 1,630,622 A | * | 5/1927 | Lea | 228/184 |
| 4,119,088 A | * | 10/1978 | Sim | 126/413 |
| 4,691,691 A | * | 9/1987 | Patenaude | 126/414 |
| 4,858,593 A | * | 8/1989 | Hsu | 126/414 |
| 5,083,916 A | * | 1/1992 | Glennon et al. | 431/344 |
| 5,803,061 A | * | 9/1998 | Kao | 126/414 |
| 6,244,853 B1 | * | 6/2001 | Oglesby et al. | 431/6 |
| 6,247,631 B1 | * | 6/2001 | Kawakatsu et al. | 228/51 |

* cited by examiner

*Primary Examiner*—Steven Bos
*Assistant Examiner*—Colleen P. Cooke
(74) *Attorney, Agent, or Firm*—Birch, Stewart, Kolasch & Birch, LLP

(57) ABSTRACT

A device for fastening a barrel of a gas operated soldering gun to a spout of a combustion chamber thereof is disclosed. The device comprises a cavity in a rear end of the barrel, a resilient clip disposed in the cavity, and a plurality of latched pieces on the clip, the latched pieces being disposed inside the clip. The spout can be fastened in the barrel by clinging the barrel to the spout as the latched pieces exert a strong, resilient force onto the spout. The invention can carry out a quick assembly or disassembly of the barrel and the spout and increase soldering efficiency and safety.

6 Claims, 4 Drawing Sheets

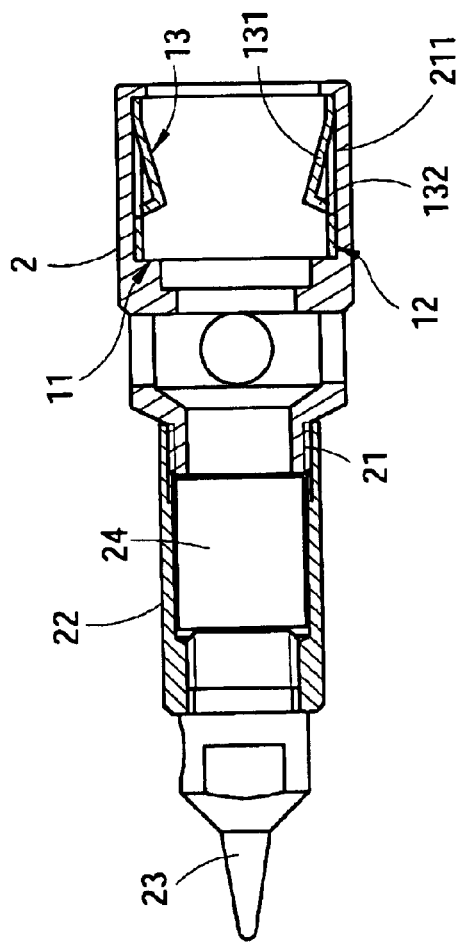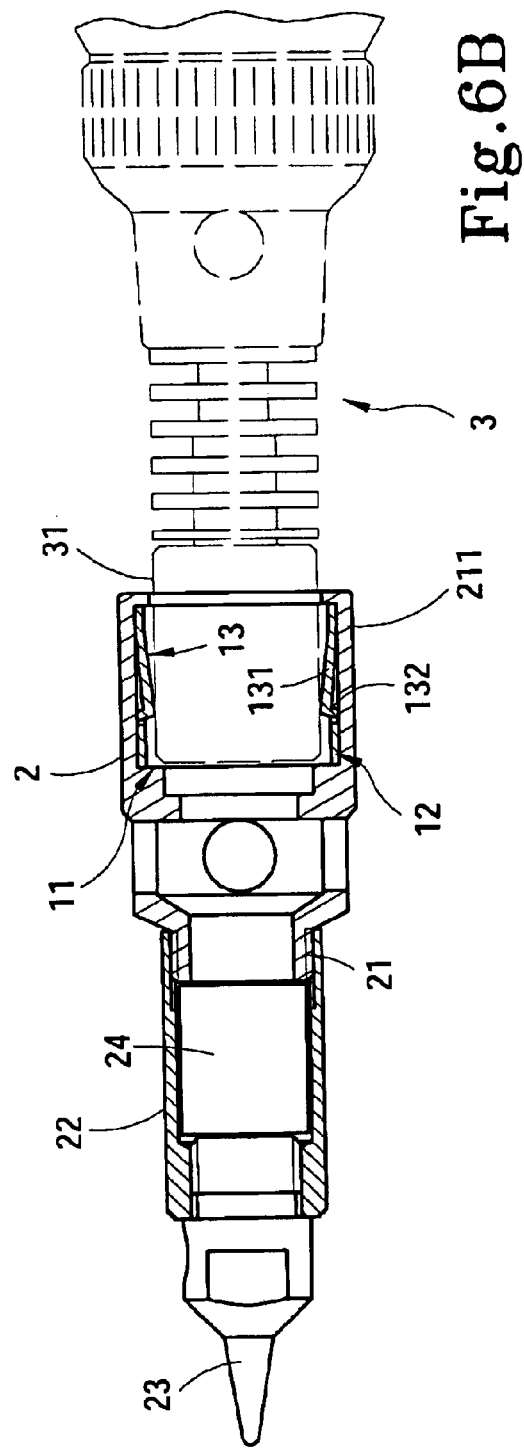
Fig.6A
Fig.6B

DEVICE FOR FASTENING BARREL OF GAS OPERATED SOLDERING GUN

FIELD OF THE INVENTION

The present invention relates to fastening devices and more particularly to a device for fastening the barrel of a gas operated soldering gun with improved characteristics.

BACKGROUND OF THE INVENTION

Gas operated soldering guns have been widely used in recent years. It has the advantages of quick heating or stopping, high safety, and convenience. The body of a conventional gas operated soldering gun 3 having substantially the same construction as the invention is shown in phantom lines in FIG. 5. The gun 3 comprises a forward barrel 2 and a rearward combustion chamber 32 with flammable gas contained therein. A nozzle 22 is threadably secured to a forward end 21 of the barrel 2. A tip 23 is threadably secured to a forward end of the nozzle 22. A spout 31, extended forwardly from the combustion chamber 32, is connectable to the barrel 2 by performing one of the following techniques.

As shown in FIG. 1, a first technique involves a coupling of the spout 31 and the barrel 2 by means of mated threaded sections 6. As shown in FIG. 2, a second technique involves a coupling of the spout 31 and the barrel 2 by means of two or more projections 4 urged against the outer surface of the spout 31 in which the projections 4 are formed by punching on the outer surface of the barrel 2. As shown in FIG. 3, a third technique involves a coupling of the spout 31 and the barrel 2 by forming a threaded hole 5 through the barrel 2 so that a screw 51 can be driven into the hole 5 to fasten the outer barrel 2 to the inner spout 31. A fourth technique involves a coupling of the spout 31 and the barrel 2 by shaping the interior of the barrel 2 differently from the outer surface of the spout 31 so that a rotation of the barrel 2 about the spout 31 or vice versa can fasten them together by snapping.

However, the prior art suffered from several disadvantages with respect to safety and convenience in practice. For example, the coupling by means of the threaded sections 6 as illustrated in FIG. 1 is time consuming in assembly or disassembly of the spout 31 and the barrel 2. As to the projections 4 illustrated in FIG. 2, despite of the benefit of quick assembly it still has the drawbacks of uncontrolled allowances of the projections 4, resulting in a failure of conforming to the spout 31, and disengagement of the spout 31 from the barrel 2 due to long time wear of hard contact between the projections 4 and the spout 31. Such drawback of disengagement of the spout 31 from the barrel 2 is also occurred in the fourth technique. As to the threaded coupling illustrated in FIG. 3, despite of the benefit of reliable fastening it also has drawbacks of requiring a tool (e.g., screw driver) to fasten the screw 51 in assembly or unfasten the screw 51 in disassembly. This is quite time consuming and tedious. Moreover, in removing the heated barrel 2 during operation the user has to use one hand to hold the gun 3 and the other hand to remove the barrel 2. This is quite inconvenient and it is possible of hurting the hand by the hot barrel if enough care is not taken. This is not a safe technique. Thus, the need for improvement still exists.

SUMMARY OF THE INVENTION

It is an object of the present invention to provide a device for fastening a barrel of a gas operated soldering gun to a spout thereof. The fastening device has advantages of quick assembly or disassembly of the barrel and the spout, increased soldering efficiency, and high safety.

To achieve the above and other objects, the present invention provides a device for fastening a barrel of a gas operated soldering gun to a spout of a combustion chamber thereof. The fastening device comprises a cavity in a rear end of the barrel, a resilient clip disposed in the cavity, and a plurality of latched pieces on the clip, the latched pieces being disposed inside the clip. The spout can be fastened in the barrel by clinging the barrel to the spout as the latched pieces exert a strong, resilient force onto the spout.

The above and other objects, features and advantages of the present invention will become apparent from the following detailed description taken with the accompanying drawings.

BRIEF DESCRIPTION OF THE DRAWINGS

FIG. 6A is a cross-sectional view of the barrel; and

FIG. 6B is a cross-sectional view of the fastened barrel and the spout.

DETAILED DESCRIPTION OF THE PREFERRED EMBODIMENTS.

Figure 1:
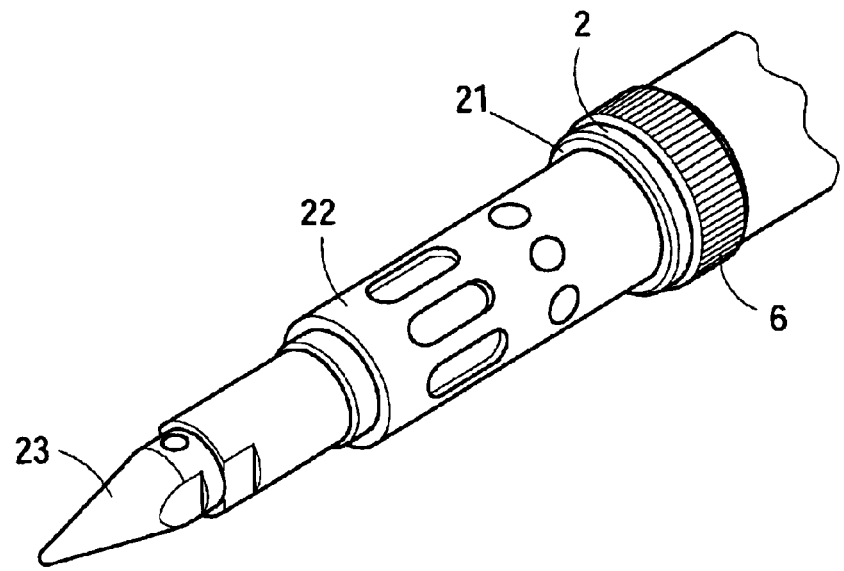
FIG. 1 is a perspective view of a forward portion of a gas operated soldering gun for illustrating an arrangement of securing a barrel to a spout of the gun.
Figure 2:
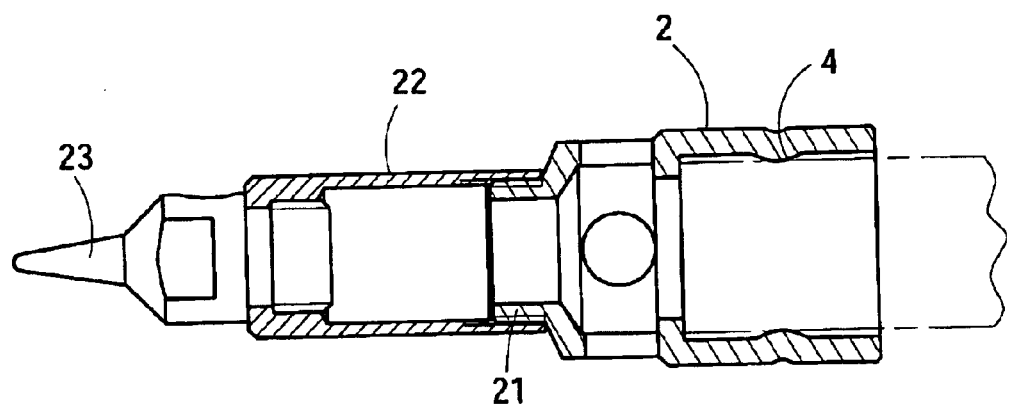
FIG. 2 is a cross-sectional view of the forward portion of the gas operated soldering gun for illustrating another arrangement of securing the barrel to the spout.
Figure 3:
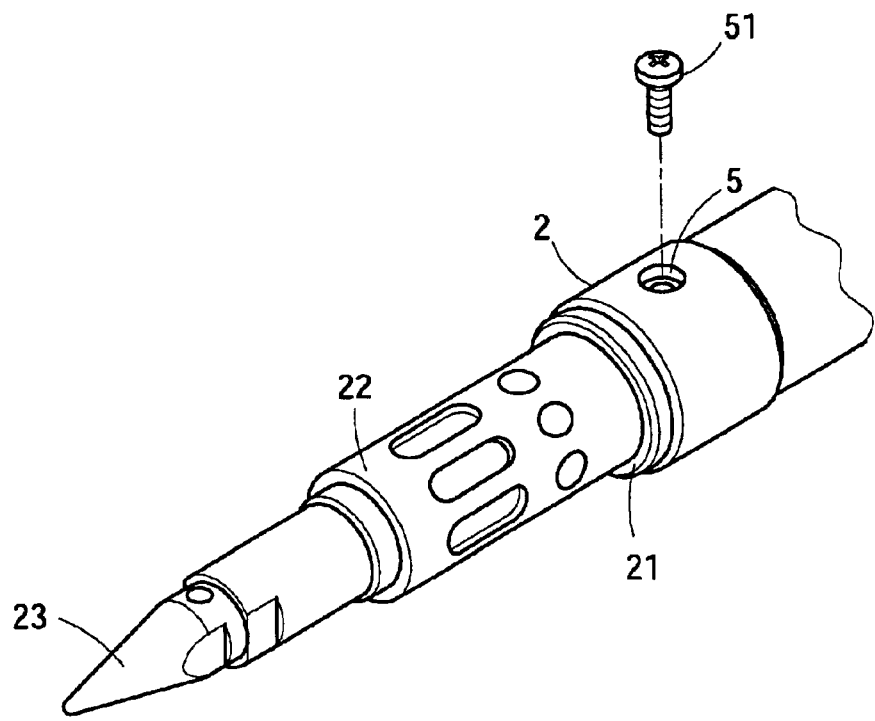
FIG. 3 is a perspective view of the forward portion of the gas operated soldering gun for illustrating still another arrangement of securing the barrel to the spout.
Figure 4:
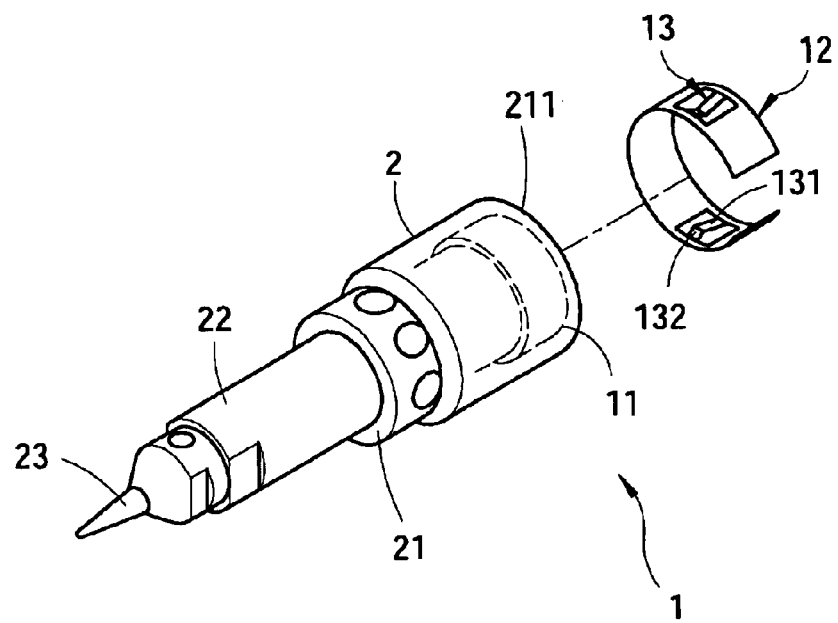
FIG. 4 is an exploded perspective view of a preferred embodiment of device for securing the barrel of a gas operated soldering gun to the spout thereof according to the invention.
Figure 5:
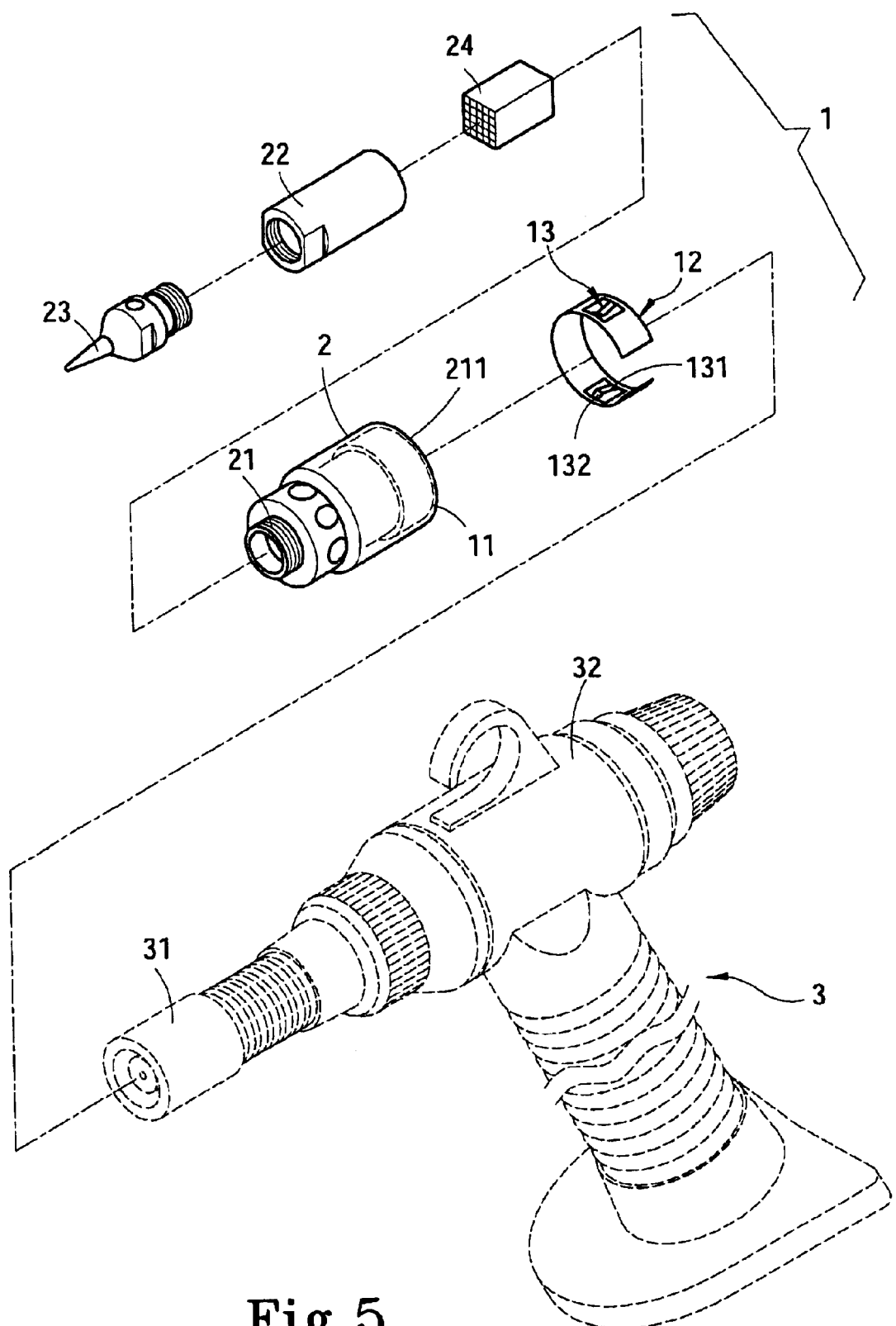
FIG. 5 is an exploded view of the fastening device with a body of the gun shown in phantom lines.

Referring to FIGS. 4 and 5, there is shown a gas operated soldering gun 3 incorporated a device 1 for fastening a barrel 2 of the gun 3 to a spout 31 of a combustion chamber 32 thereof in accordance with the invention. A nozzle 22 is threadably secured to a forward end 21 of the barrel 2. A tip 23 is threadably secured to a forward end of the nozzle 22. A parallelepiped tube assembly 24 is mounted in the nozzle 22 for heating the tip 23 in a short period of time. The fastening device 1 comprises a cavity 11 formed in a rear end 211 of the barrel 2, a resilient clip (e.g., C-shaped clip ring as shown) 12 mounted in the cavity 11, and two opposite latched pieces 13 on the C-shaped clip ring 12, the latched piece 13 being formed by punching on the C-shaped clip ring 12. The latched piece 13 comprises a guide slope 131 integrally formed with the C-shaped clip ring 12, and a bent tab 132 formed at an open end of the guide slope 131.

Referring to FIGS. 6A and 6B in conjunction with FIG. 5, an operation of the invention will be described in detail below. First, snap the C-shaped clip ring 12 into the cavity 11 for positioning in which the guide slopes 131 are projected inside the cavity 11 (see FIG. 6A). Next, cling the barrel 2 to the spout 31 until the spout 31 is stopped by a bottom of the cavity 11 after passing the guide slopes 131. In this position, the spout 31 is fastened in the barrel 2 by the joining portions of the tabs 132 and the guide slopes 131 as the guide slopes 131 exert a strong, resilient force toward the spout 131.

For disengaging the barrel 2 from the spout 31, simply pull the barrel 2 forward with one hand by holding the spout 31 with the other hand. Alternatively, for disengaging the barrel 2 from the spout 31 during or after a soldering process, simply use a heat resistant tool to grasp the barrel 2 prior to pulling it forward with one hand and hold the spout 31 with the other hand. In view of the above, the fastening device of the invention not only can carry out a quick assembly or disassembly of the barrel 2 and the spout 31 but also can increase soldering efficiency as well as safety.

While the invention herein disclosed has been described by means of specific embodiments, numerous modifications and variations could be made thereto by those skilled in the art without departing from the scope and spirit of the invention set forth in the claims.

What is claimed is:

1. A device for fastening a barrel of a gas operated soldering gun to a spout of a combustion chamber thereof, comprising:

a cavity in a rear end of the barrel;

a resilient clip disposed in the cavity; and a plurality of latched pieces on the clip, the latched pieces being disposed inside the clip, whereby clinging the barrel to the spout will cause the spout to fasten in the barrel by a resilient force exerted by the latched pieces onto the spout.

2. The device of claim 1, wherein the clip is a C-shaped clip ring.

3. The device of claim 1, wherein each of the latched pieces comprises a guide slope and a bent tab at one end of the guide slope.

4. The device of claim 3, wherein the guide slopes are integrally formed with the clip.

5. The device of claim 3, wherein one end of the guide slope is a free end.

6. The device of claim 1, wherein the latched pieces are formed by punching on the barrel.

\* \* \* \* \*